(12) United States Patent
Hugo et al.

(10) Patent No.: US 9,322,296 B2
(45) Date of Patent: Apr. 26, 2016

(54) DISTRIBUTED COMPRESSED AIR ENERGY STORAGE SYSTEM AND METHOD

(76) Inventors: Ronald J. Hugo, Calgary (CA); David W. Keith, Calgary (CA); Hossein Safaei Mohamadabadi, Calgary (CA)

( * ) Notice: Subject to any disclaimer, the term of this patent is extended or adjusted under 35 U.S.C. 154(b) by 103 days.

(21) Appl. No.: 14/003,199

(22) PCT Filed: Mar. 2, 2012

(86) PCT No.: PCT/US2012/027415
§ 371 (c)(1),
(2), (4) Date: Feb. 3, 2014

(87) PCT Pub. No.: WO2012/122004
PCT Pub. Date: Sep. 13, 2012

(65) Prior Publication Data
US 2014/0159371 A1    Jun. 12, 2014

Related U.S. Application Data

(60) Provisional application No. 61/449,578, filed on Mar. 4, 2011.

(51) Int. Cl.
*F03G 6/00* (2006.01)
*F01K 3/00* (2006.01)
*F03D 9/00* (2006.01)
(Continued)

(52) U.S. Cl.
CPC ... *F01K 3/00* (2013.01); *F02C 6/16* (2013.01); *F03D 9/00* (2013.01); *H02K 57/003* (2013.01); *F05B 2220/704* (2013.01); *F05B 2260/42* (2013.01); *F05D 2220/74* (2013.01); *F05D 2260/42* (2013.01); *Y02E 10/725* (2013.01); *Y02E 20/14* (2013.01); *Y02E 60/15* (2013.01)

(58) Field of Classification Search
CPC .......................................................... F02C 6/16
USPC .......................................... 60/641.14; 290/2
See application file for complete search history.

(56) References Cited

U.S. PATENT DOCUMENTS

| | | | | |
|---|---|---|---|---|
| 4,942,736 A | * | 7/1990 | Bronicki | 60/641.12 |
| 5,317,904 A | * | 6/1994 | Bronicki | 62/87 |
| 5,448,889 A | * | 9/1995 | Bronicki | 60/641.14 |

(Continued)

OTHER PUBLICATIONS

Philippe Bécamel, International Preliminary Report on Patentability, PCT Application No. PCT/US2012/027415, Sep. 10, 2013, 5 pages.

(Continued)

*Primary Examiner* — Tho D Ta
(74) *Attorney, Agent, or Firm* — Fish & Richardson P.C.

(57) ABSTRACT

A distributed compressed air storage system and method is described. A compression facility is configured to compress air and provides the compressed air to a pipeline. The pipeline is coupled to the compression facility and is configured to transport compressed air from the compression facility to a compressed air storage facility that is remote from the compression facility. A heat recovery unit is coupled to the compression facility and is configured to recover heat produced by compressing air in the compression facility. The compressed air storage facility is configured to store compressed air received from the pipeline and is located remote from the compression facility. An expansion facility is configured to receive compressed air from the compressed air storage facility and expand the compressed air to generate electricity.

40 Claims, 7 Drawing Sheets

(51) Int. Cl.
*F02C 6/16* (2006.01)
*H02K 99/00* (2014.01)

(56) References Cited

U.S. PATENT DOCUMENTS

| | | | | |
|---|---|---|---|---|
| 5,832,728 | A | * | 11/1998 | Buck ................................ 60/407 |
| 2007/0006586 | A1 | | 1/2007 | Hoffman et al. |
| 2010/0251712 | A1 | | 10/2010 | Nakhamkin |
| 2011/0041501 | A1 | | 2/2011 | Gerard |
| 2011/0070032 | A1 | * | 3/2011 | Frazier et al. ................. 405/210 |
| 2012/0119510 | A1 | * | 5/2012 | Herzen et al. ................. 290/1 C |

OTHER PUBLICATIONS

International Search Report and Written Opinion from co-pending PCT Application No. PCT/US2012/027415, mailed Sep. 28, 2012.

* cited by examiner

DISTRIBUTED COMPRESSED AIR ENERGY STORAGE SYSTEM AND METHOD

CLAIM OF PRIORITY

This application claims priority under 35 U.S.C. §119(e) to U.S. Provisional Patent Application Ser. No. 61/449,578, filed on Mar. 4, 2011, the entire contents of which are hereby incorporated by reference.

TECHNICAL FIELD

This disclosure relates to compressed air energy storage.

BACKGROUND

Large scale penetration of renewable energy sources, such as wind and solar energy, into an electric grid is complicated by the substantial hourly, daily, and seasonal fluctuations of such energy sources. Energy storage systems can mitigate these fluctuations by storing excess off-peak energy for use at peak-demand times. Compressed Air Energy Storage (CAES) is one example of a storage technology and can store a large amount of energy at an economical cost. Although conventional CAES systems are operational, they do suffer from low overall efficiency due to the significant amount of energy lost during the air-compression process in the form of waste heat. The Adiabatic CAES design can improve the economics of a conventional CAES system by storing the heat of compression and using it to heat the compressed air prior to the expansion process and electricity generation. However, this design is challenged by the technical complexity of the heat storage system due to the high pressures and temperatures of the compressed air. Isothermal CAES is another proposed design that focuses on improving the efficiency of CAES by close-to-isothermal compression and expansion processes. Coupling conventional CAES facilities with simple cycle gas turbine plants in various configurations for enhanced heat recovery has also been proposed to improve the storage efficiency of CAES facilities.

CAES systems are usually considered for storage requirements of tens of megawatts (MW) of electric power and hours of discharge time. There are at least two commercial CAES facilities presently in operation. The first facility located in Huntorf, Germany, can store up to 310,000 cubic meters ($m^3$) of compressed air at a pressure range of 48-66 bar in two salt caverns and can produce 290 MW of electricity at full capacity for four hours. The McIntosh plant is the second commercial CAES facility and is located in Alabama. The McIntosh plant generates 110 MW of electricity at full capacity for 26 hours and can store up to 560,000 $m^3$ of compressed air at a pressure range of 45-74 bar in a salt cavern.

SUMMARY

In general, in one aspect, the invention features a distributed compressed air storage (D-CAES) system. The D-CAES system includes a compression facility that is configured to compress air and a pipeline that is coupled to the compression facility and is configured to transport compressed air from the compression facility to a compressed air storage facility that is remote from the compression facility. The D-CAES system includes a heat recovery unit that is coupled to the compression facility and is configured to recover heat produced by compressing air in the compression facility. The compressed air storage facility is configured to store compressed air received from the pipeline and is located remote from the compression facility. The D-CAES system further includes an expansion facility that is configured to receive compressed air from the compressed air storage facility and expand the compressed air to generate electricity.

Implementations of the invention can include one or more of the following features. The expansion facility can be located at a same location as the compression facility or at a different location. The expansion facility can be located at a same location as the compressed air storage facility or at a different location, and can be located at a different location than both the compression facility and the compressed air storage facility.

The compression facility can be located in an urban location and the compressed air storage facility can be located in a rural location. The compression facility can be located in a rural location that is different than a rural location of the compressed air storage facility and similarly, both can be located in different urban locations. The compression facility can be located in a densely populated location and the compressed air storage facility can be located in a sparsely populated location. The compression facility can be located at a same location as a heat load, and heat recovered by the heat recovery unit can be supplied to satisfy, at least in part, the heat load, and the compressed air storage facility can be located at a different location than the heat load.

The system can further include a thermal energy storage unit coupled to the heat recovery unit and configured to store at least some of the heat recovered by the heat recovery unit. The compression facility can be coupled to a heating system that is configured to provide heat to one or more facilities and heat recovered by the heat recovery unit can be used to provide heat to the one or more facilities. The expansion facility can be further configured to provide the generated electricity to the one or more facilities. The heating system can be a district heating system. The district heating system can include a boiler system configured to generate hot water and the heat recovered by the heat recovery unit can be used to generate hot water.

The heat recovered by the heat recovery unit can be provided to satisfy a heat load for a region that is proximate to the compression facility, and the region is remote from the compressed air storage facility and the expansion facility.

The compression facility can be powered by electricity. The electricity can be provided by a renewable-energy based source of electricity, e.g., a wind energy source or a solar energy source. The system can further include a renewable-energy based source of electricity, which is configured to provide electricity to the compression facility and to a region that is proximate to the compression facility to satisfy at least one of a heat load or an electric load of the region. Electricity generated by the expansion facility can be provided to the region to satisfy at least one of the heat load or the electric load of the region.

The compression facility can be located approximately five to fifty kilometers away from the compressed air storage facility, although different distances are possible and this range is an illustrative example. The compressed air storage facility can be a naturally occurring underground storage facility, e.g., a cavern or depleted gas reservoir or a manmade underground storage facility. The compressed air storage facility can be an above ground storage facility, e.g., one or more vessels, pipes or tanks. The compression facility can include one or more compressors.

The expansion facility can include one or more turbines. The expansion facility can include a heat source and is configured to heat the received compressed air. The heat source can be one or more of a combustor, heat recovered from a proximate facility that generates waste heat or a recuperator for heat recovery from exhaust of one or more turbines. The expansion facility can further include one or more generators coupled to one or more turbines, wherein the one or more generators are configured to generate electricity.

The system can further include a control system configured to determine when to retrieve compressed air from the compressed air storage facility and generate electricity. The control system can be configured to receive data from one or more sources and the determination can be based, at least in part, on the received data. The one or more sources can include one or more sensors and/or a source that provides data about prices of electricity and/or a source that provides data about demand for electricity.

In general, in another aspect, the invention features a method that includes compressing air at a compression facility and transporting the compressed air through a pipeline to a compressed air storage facility that is located remote from the compression facility. Heat that is generated from compressing the air is recovered and provided to satisfy at least one of a heat load or an electric load for one or more facilities that are located proximate to the compression facility. The compressed air is stored in the compressed air storage facility. The compressed air is retrieved from the compressed air storage facility and expanded at an expansion facility to generate electricity.

Implementations of the invention can include one or more of the following features. The electricity generated by the expansion facility can be provided to satisfy at least one of the heat load or the electric load for the one or more facilities. The compression facility can be coupled to a district heating system that is configured to provide heat to satisfy the heat load of the one or more facilities. At least some of the recovered heat from the compression process can be stored in a thermal energy storage unit. A determination can be made when to retrieve compressed air from the compressed air storage facility to generate electricity based at least in part on a price of and/or demand for electricity at a time of retrieval.

The compressed air storage facility can be a naturally occurring formation, e.g., an underground cavern or depleted gas reservoir, or can be an underground or above ground manmade facility, e.g., a vessel, pipe and/or tank. The compression facility can be provided electricity from a renewable-energy based source of electricity, e.g. a wind energy based source or a solar energy based source. The expansion facility can be located at a same location as the compression facility or a different location. The expansion facility can be located at a same location as the compressed air storage facility or a different location. The expansion facility can be located at a different location than the compression facility and a different location than the compressed air storage facility. The compression facility can be located in an urban location and the compressed air storage facility can be located in a rural location, or both can be located at urban or rural locations that are different from each other. The compression facility can be located in a densely populated location and the compressed air storage facility can be located in a sparsely populated location.

Implementations of the invention can realize one or more of the following advantages. A compressed air energy storage system can be provided with improved efficiency. For example, the financial savings of waste heat recovery from the air compression process can outweigh the capital costs associated with an air pipeline between the compression facility and the compressed air storage facility. The overall economics of the system can thereby be improved. Due to the reduced consumption of heating fuel, the net greenhouse gas (GHG) emission for heating purposes can be reduced.

The details of one or more embodiments of the invention are set forth in the accompanying drawings and the description below. Other features, objects, and advantages of the invention will be apparent from the description and drawings, and from the claims.

DETAILED DESCRIPTION

A CAES system can use inexpensive off-peak electricity to compress air, which can be stored in a compressed air storage facility that can be underground (e.g., a salt cavern) or above ground. During peak hours of electricity demand, compressed air retrieved from the storage facility is heated, to prevent moisture in the air from freezing during expansion, and expanded in modified gas turbines to generate electricity. The requirement to burn fuel prior and/or during the expansion process limits the round trip efficiency of energy storage in a conventional CAES system.

Methods and systems are described herein that improve the efficiency of a CAES system. A Distributed CAES (D-CAES) system is described that employs an air-compression station at a location that is proximate to one or more facilities with a heat load requirement and is remote from the compressed air storage facility and can be remote from the expansion facility (i.e., turbine). In some implementations, a municipal-scale integrated compressed air pipeline network, supplied by distributed compressors located near high heat-load facilities (e.g., universities), uses off-peak electricity to compress air. This system can use or store the heat produced by air-compression for heating needs, and lower the overall cost of the D-CAES system by negating the demand for alternative heating (e.g., fuel) within the municipal region. The compressed air from the system can be pipelined to favorable locations for storage, e.g., to a favorable geographical location for underground storage. The expansion facility of the D-CAES system can be located at the storage site or located with the compressor and can generate electricity by combustion and expansion of stored compressed air.

Figure 1:
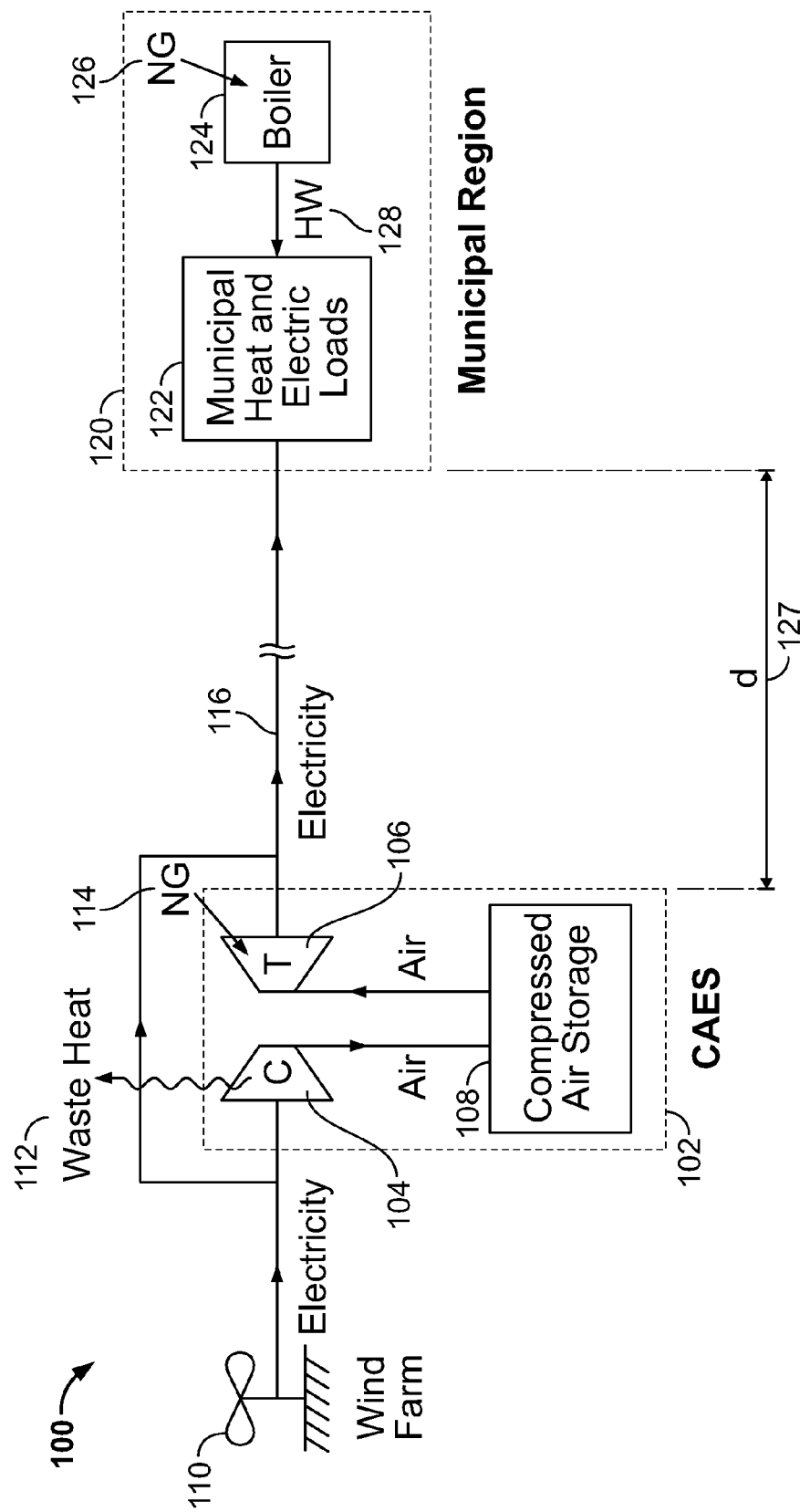
FIG. 1. is a schematic representation of an example CAES system.

FIG. 1. is a schematic representation of an example conventional CAES system 102. Electricity generated from the CAES system 102 is provided to a municipal region 120 that is located remote from the CAES system 102. In this example, the municipal region 120 is a distance, d (127), away from the CAES system location, as the source of electricity (e.g., a wind farm or a hydroelectric facility) is not proximate to a municipal region.

The CAES system is located near a source of electricity, which in this example is a wind farm 110. Electricity from the wind farm powers a compression facility 104 that is used to compress air. The heat generated from compressing the air is not captured and is exhausted to the surrounding atmosphere as waste heat 112. The compressed air is stored in a compressed air storage facility 108. In one example, the compressed air storage facility 108 is an underground cavern, such as a salt cavern. When electricity is required to supply the municipal heat and electric loads 122 of the municipal region 120, compressed air can be retrieved from the compressed air storage facility 108. The compressed air is heated, to prevent freezing, and expanded in an expansion facility 106, e.g., a turbine. In this example, natural gas fuel is burned to heat the compressed air. Electricity is generated by expanding the compressed air and is transmitted to the municipal region 120, i.e., electricity 116. Electricity generated by the wind farm 110 that is not consumed by the CAES system 102 is also transmitted directly to the municipal region 120. The municipal region employs a distributed heating system that includes a boiler system 124, which in this example is heated by natural gas, to heat water. The heated water 128 is provided to satisfy the municipal heat loads, e.g., in the form of radiant heat.

Figure 2:
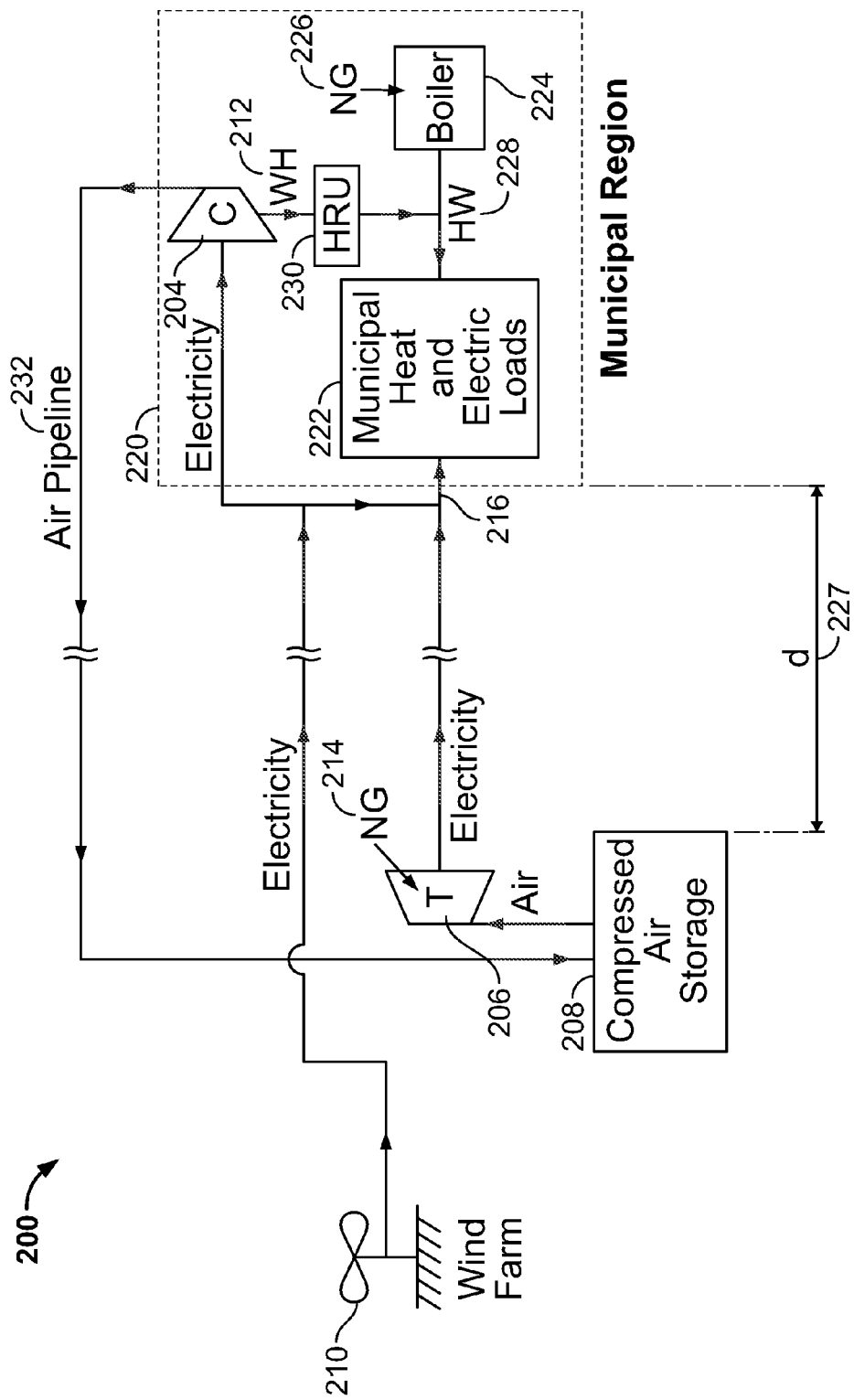
FIG. 2 is a schematic representation of an example distributed CAES system.

FIG. 2 is a schematic representation of an example distributed compressed air energy storage (D-CAES) system. The D-CAES includes a compression facility 204 that is located within, or proximate to, a municipal region 220 that has municipal heat and electric loads 222. The municipal region 220 represents any region with a heat load, which may be in a municipality but may not and the use of the term municipal region herein is illustrative and non-limiting. By way of illustrative and example, the municipal region 220 can be a university campus that includes multiple facilities that require heat and electricity. In another example, the municipal region 220 can be a town that includes multiple houses, businesses and other facilities. In another example, the municipal region 220 can be a plant that is situated away from a municipality and that has a heat load. That is, the municipal region is not limited to a town or city (although it can be a town or city) and may represent any location with local heat loads.

The compression facility 204 is powered by electricity. In this example, the electricity is provided by a wind farm 210 that is located at a location remote from the municipal region 220. Other sources of electricity can be used either alone or in conjunction with the wind energy which can be nonrenewable-based or renewable-based, e.g., solar energy, hydroelectric energy, coal, nuclear. Air that is compressed by the compression facility 204 is transported by one or more pipelines, e.g., pipeline 232, to one or more compressed air storage facilities, e.g., compressed air storage 208. The one or more compressed air storage facilities are located at one or more locations that are remote from the compression facility 204 and the municipal region 220. In this example, the compressed air storage 208 is located at a distance, d (227), from the municipal region 220. The distance, d (227), can be any distance from the municipal region, although preferably is selected based at least in part on the economics of the overall system 200, which is discussed in further detail below.

Generally speaking, the distance, d, is a distance large enough that a pipeline is used to transport the air between the compression facility 204 and the compressed air storage 208, i.e., these facilities are remote from each other and not at the same location. In some implementations, the compression facility 204 is located in an urban region and the compressed air storage 208 is located in a rural region. In some implementations, the compression facility 204 is located in a populated (or even densely populated) region and the compressed air storage 208 is located in a sparsely populated (even an unpopulated) region.

Heat that is generated at the compression facility 204 by compressing the air (i.e., waste heat (WH) 212) is captured by one or more heat recovery units, e.g., heat recover unit (HRU) 230. By way of illustrative example, the HRU 230 can be a shell and tube type heat exchanger used for heat transfer from compressed gas to liquid. The captured waste heat is used to satisfy (at least in part) the municipal heat and electric loads 222. For example, the HRU 230 can provide a heated fluid, e.g., hot water or steam, that can be provided into a district heating (DH) system to satisfy the municipal heat load, e.g., in the form of radiant heat. In the example shown, the captured waste heat is used in conjunction with heat provided by a boiler system 224. In some implementations, the boiler system 224 is included in a DH system, which is discussed further below. In this example, the boiler system 224 is heated by natural gas, although other forms of heat can be used. The boiler system 224 provides heated water to satisfy the municipal heat loads, e.g., by providing radiant heat. In some implementations, the waste heat 212 can be used to generate electricity, e.g., using an organic Rankine cycle, and can be provided to satisfy at least part of the municipal electric load.

In the implementation shown, electricity generated by the wind farm 210 that is not consumed by the compression facility 204 is provided to the municipal region 220 to help satisfy the municipal heat and electric loads 222, i.e., electricity 216.

The D-CAES is configured to generate electricity by retrieving compressed air from the one or more compressed air storage facilities, e.g., compressed air storage 208, and expanding the air in an expansion facility 206 (e.g., one or more turbines). The compressed air is generally pre-heated before expansion, e.g., to prevent freezing of moisture in the air. In this example, natural gas 214 is used as fuel to provide the pre-heating, although it should be understood that other sources of heat can be used, e.g., solar heat. If expansion of the air occurs in one stage, then the heating process is prior to expansion. If multiple expansion stages are employed, then heating can be before the first stage or between expansion stages or between each expansion stage, which can be based on the expansion pressure ratio. The heated, compressed air is expanded and the expansion facility 206 generates electricity.

In some implementations, the D-CAES employs a simple cycle gas turbine plant, e.g., a Brayton-cycle engine, to generate electricity. The plant can include compression, combustion, expansion, generation and Balance of the Plant (BOP) facilities. However, as described herein, the compression facility is located remote from the compressed air storage facility. The compression and expansion processes are generally not occurring at the same time. For example, compression can occur during off-peak hours and/or when electricity prices are low and can be powered by electricity from a power grid. Expansion can occur during peak demand hours and/or when electricity prices are high and can include burning fuel in the combustion facility. The economic principle can be simply to arbitrage electricity prices whatever the source of supply: buying electricity when prices are low and selling electricity when prices are high.

The electricity generated by the D-CAES can be provided to the municipal region 220 to satisfy the municipal heat and electric loads 222, i.e., electricity 216, stored or otherwise consumed.

The D-CAES can include a control system. The control system can be implemented at the expansion facility 206, the compressed air storage facility 208, the compression facility 204 or elsewhere or some combination thereof. That is, the control system can be distributed and implemented, for example, as two or more controllers that are in communication with each other and/or with a central controller. The control system can be configured to control operations of the compression facility 204, the HRU 230, the expansion facility 206 and the compressed air storage facility 208. The control system can receive information from one or more sensors or other devices that can transmit information that can be used to make operating decisions. For example, data about electricity demands from the municipal heat and electric loads 222 can be used to determine whether to retrieve compressed air from the compressed air storage 208 to generate electricity. Data about a current or projected price of electricity can be used, at least in part, to make the same determination. The control system can be configured to operate automatically, i.e., without human intervention other than for unusual operating circumstances. The control system can use data about: the energy level of a cavern being used as the compressed air storage facility; the weather forecast for wind (if wind energy is being used) or Sun (if solar energy is being used); heat loads at the municipal region; the need for ancillary services and/or the congestion of transmission lines, among other factors, to determine when to retrieve compressed air and generate electricity. The nature of the electricity market, e.g., the bidding process, also can be a factor in determining operations of the D-CAES.

In the D-CAES system, the compressed air storage 208 and the expansion facility 206 can be located proximate to each other, although they do not need to be, and can be located in a geographically favorable location. That is, by way of example, they can be located somewhere that has an inexpensive land cost, a natural underground cavern (e.g., a salt cavern or depleted gas reservoir) and/or is located near, or with access to, a source of electricity. The source of electricity can be a renewable energy source, e.g., the wind farm 210, or can be a solar energy facility (e.g., a heliostat field) or a hydroelectric facility. If the compressed air is to be stored in man-made above ground storage structures (e.g., pipes and/or tanks), access to inexpensive land can be a consideration when determining where to locate the compressed air storage and expansion facility.

In some implementations, the expansion facility 206 is located remote from the compressed air storage 208, either at the same location as the compression facility 204 or somewhere else. Locating the expansion facility 206 remote from the compressed air storage 208 can require piping the compressed air to the expansion facility 206, which can have an economic impact on the D-CAES system that can be avoided by locating the expansion facility 206 close to the compressed air storage 208. In some implementations, the expansion facility 206 is located together with the compression facility 204. The expansion facility 206 can be configured as a co-generation facility and the generated heat can be supplied to the district heating system. The same air pipeline, i.e., pipeline 232, can be used to pipe compressed air from the compressed air storage 208 to the expansion facility 206. Although piping the air can result in a pressure drop between the compressed air storage and the expansion facility 206, this potentially negative effect can be outweighed by other favorable effects of locating the expansion facility 206 with the compression facility 204. For example, there can be savings on capital costs (e.g., less costs for gas and electrical interconnects), labor and construction when constructing the D-CAES system.

In some implementations, the expansion facility 206 is remote from the compressed air storage 208 and the compression facility 204. For example, a favorable location for the expansion facility 206 may be a location that is near a source of "waste heat" that can be captured and used to heat the compressed air before or during the expansion process. In another example, the expansion facility 206 can be located near transmission lines to reduce the associated transmission costs of electricity from the expansion facility to an electric load site. In short, a favorable location for the expansion facility 206 may be different than a favorable location for the compressed air storage 208 and accordingly, although both may be remote from the compression facility 204, they may not be located together at the same location. In these implementations, a second pipeline can be used to pipe the compressed air from the compressed air storage 208 to the expansion facility 206.

The compression facility 204 is located remote from the compressed air storage 208 and expansion facility 206. The compression facility 204 is located at or near an entity that can use heat captured from the compression process. For example, if the municipal region 220 represents a university campus, the compression facility 204 can be located within or adjacent to the facilities that satisfy the heat and electric loads for the university campus.

In some implementations, the D-CAES system is used in conjunction with a district heating (DH) system, as was mentioned above. A DH system is a system for distributing heat generated in a centralized location for residential and commercial heating requirements, e.g., space heating and water heating. The centralized location can include a boiler system that generates heat in the form of heated water or steam that is distributed to consumers (i.e., residences or other facilities) by a network of insulated pipes. At the consumer level the DH system can be connected to a central heating system for the consumer facility by a heat exchanger. Typically the water or steam used in the DH system is not mixed with the water of the central heating system for the consumer facility. Some DH systems include a cogeneration plant that can generate heat and electricity. DH systems exist in various sizes, for example, covering an entire city or a small village or a limited number of residences. In some implementations, the "municipal region" 220 in FIG. 2 can represent a region that is heated by a DH system. The waste heat 212 captured from the compression facility 204 can be used to supplement the heat provided by the DH system that operates to provide heat to the municipal region 220.

Figure 3:
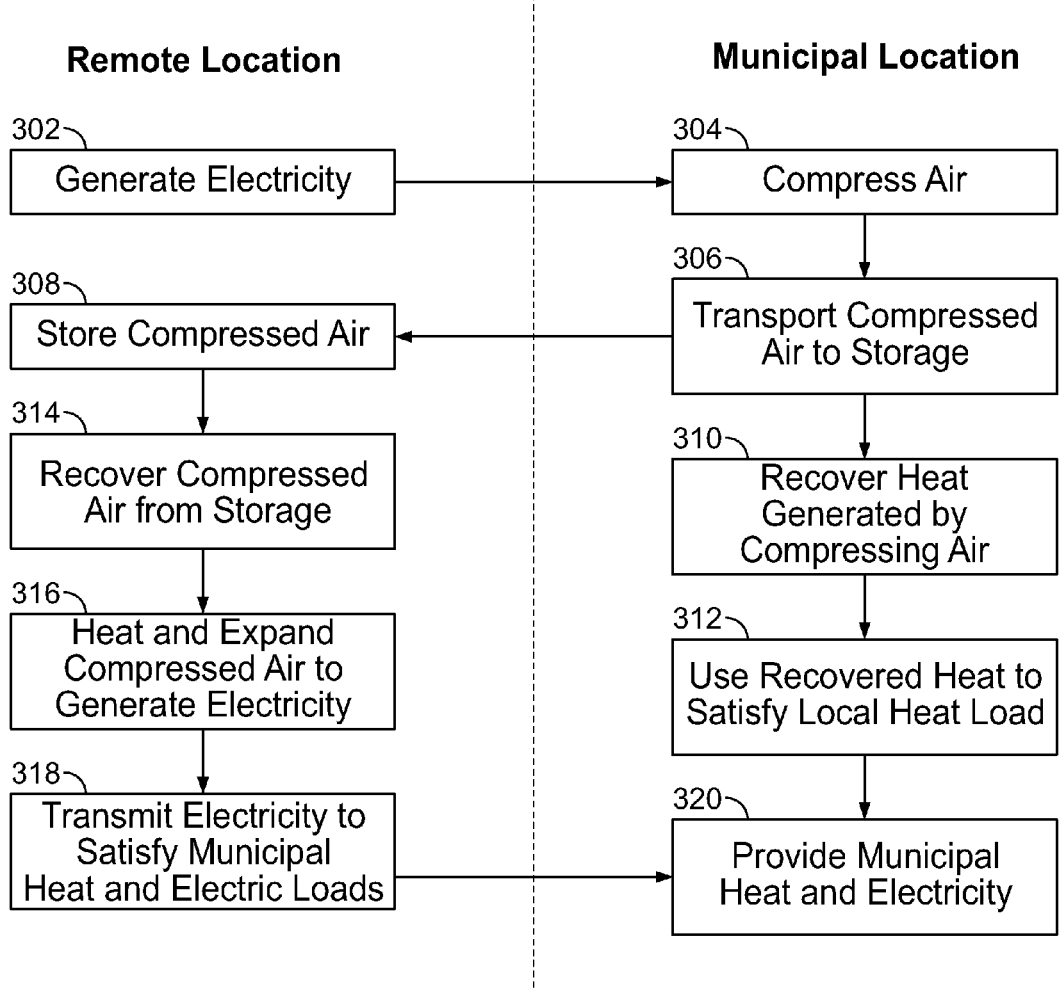
FIG. 3 is a swim-lane diagram showing an example process for operating a distributed CAES system.

FIG. 3 is a swim-lane diagram showing an example process for operating a D-CAES system. Steps in the process that occur at a municipal location, i.e., a region that is consuming heat generated by the compression facility of the D-CAES, are shown in the right column. Steps in the process that occur at a location that is remote from the municipal location are shown in the left column. However, it should be understood that the steps shown in the left column do not have to occur at the same remote location, but that they do occur at one or more locations that are not in the proximity of the municipal location.

Electricity is generated (Box 302) that is provided to a compression facility of the D-CAES. Although electricity generation is shown as remote from the compression facility, in other implementations the electricity is generated local to the compression facility. The compression facility compresses air (Box 304). The compressed air is transported to a compressed air storage facility that is remote from the compression facility by a pipeline (Box 306). The compressed air is received and stored at the compressed air storage facility (Box 308).

Heat that is generated at the compression facility as a byproduct of compressing the air is recovered (Box 310). The recovered heat is used to satisfy a local heat load at the municipal location (Box 312). Heat is thereby provided to the municipal location (Box 320). It should be understood that the recovered heat can be either immediately used for heating purposes or can be stored, for example, in a thermal energy storage unit, for later use (e.g., based on demand and/or value), or a combination thereof (i.e, partially used immediately and partially stored). A thermal energy storage unit can enhance the economics of the D-CAES.

Referring again to FIG. 3, the stored compressed air can be retrieved from the compressed air storage (Box 314). The retrieved compressed air can be provided to an expansion facility where the air is heated and expanded to generated electricity (Box 316). The generated electricity can be transmitted to satisfy the municipal heat and/or electric loads (Box 318).

As is described below, the economics of CAES can be improved by the use of otherwise wasted heat of compression, e.g., for space and water heating demands, in a D-CAES system. As described above, the D-CAES system includes a pipeline between the compression site (e.g., a municipal region) and the storage site (e.g., a cavern). The trade-off between the increased capital cost of the system (mainly due to the compressed air pipeline), and savings on fuel (used for heating purposes at the municipal region) can make the D-CAES system less expensive as compared to a conventional CAES. The intensity and the profile of the heat load, profile of the electric load, wind conditions, distance between the heat load and storage facility, and the construction costs are considerations in this trade-off.

Table 1 below shows nomenclature that is used in this description.

TABLE 1

| Symbol | Description | Unit |
|---|---|---|
| Q | Flowrate of gas | m³/day |
| f | Friction factor | Dimensionless |
| $P_b$ | Base pressure | K |
| $T_b$ | Base temperature | K |
| $P_1$ | Upstream pressure | KPa |
| $P_2$ | Downstream pressure | KPa |
| G | Specific gravity of gas | Dimensionless |
| $T_f$ | Average temperature of gas | K |
| L | Length of pipeline | Km |
| Z | Compressibility factor of gas | Dimensionless |
| D | Inside pipe diameter | Mm |
| $P_{eff}$ | Effective natural gas price | $/GJ |
| $P_{market}$ | Market price of natural gas | $/GJ |
| $C_{tax}$ | Carbon tax | $/t Ceq |
| CC | Carbon content of fuel | T Ceq/GJ |

To illustrate the potential benefits of a D-CAES system, a hypothetical scenario is described below that compares an example conventional CAES system and an example D-CAES system. The results shown and described are only valid for the particular hypothetical scenario and cases described. The hypothetical scenario was developed in which a variable (but concentrated) heat load and a variable electric load were to be satisfied over a period of one full year. In this scenario, the heat load would be supplied by a District Heating (DH) system and the electric load would be supplied by a combination of a wind farm and a CAES system in two different configurations; a conventional CAES and a D-CAES. Wind would be the only energy source used to charge the CAES system in both scenarios. The associated costs with the transmission line and the DH system were excluded in calculating the economics, since both would exist in the two situations. The scenario assumed that a compressed air storage facility was already justified by the market and either a conventional CAES or a D-CAES system would be built.

In the CAES system, the electric load for the municipal region would be satisfied by a combination of wind energy and conventional CAES. Both the compressor and the expander of the CAES system would be located at the compressed air storage site. A natural gas-based boiler would provide the heating energy of the DH system that would be located close to the heat load (i.e., within the municipal region).

In the D-CAES system, the compression facility would be located within the municipal region, while the expander (turbine) would be located at the compressed air storage site. The compressed air would be pipelined from the compression facility site to the compressed air storage site. A waste Heat Recovery Unit (HRU) would recover the otherwise wasted heat of compression. The heat load would be satisfied by a combination of a natural gas-based boiler and the HRU via the DH system. No heat storage facility was considered in this phase, meaning that the heat of compression would be dumped to the surrounding if not immediately used for heating purposes.

A linear optimization code was developed in MATLAB to minimize the normalized cost (both capital and operating) associated with meeting the hourly electric and heat loads over one full year. Both the size of various components and the dispatch strategy of the wind farm, CAES, D-CAES, and DH systems were optimized in order to minimize the normalized cost.

To simulate the heat load, EE4 software was used to simulate hourly heating loads of a 20 floor tower (40×40 m plan) located in Alberta, Canada over one full year. Once the heat load profile was determined, it was scaled up to result in the same annual heat load as the main campus of the University of Calgary, Alberta in 2008. This profile was used to represent a concentrated municipal heat load that the DH system was to satisfy.

To simulate the electric load, the minimum hourly electric load of the province of Alberta in 2008 was used to determine the hourly peak load profile of electricity over the year of study. The profile was scaled down $10^5$ times to form the "peak electric load" profile. This electric load profile was later used to develop various electric load scenarios.

Hourly wind power generation data from Alberta in 2008 was used to calculate the hourly wind power capacity factor of the wind farm over the entire year of the study.

Pressure drop in gas pipelines can be calculated from Equation 1 shown below.

$$Q = 1.1494 \times 10^{-3} \times \left(\frac{Tb}{Pb}\right) \times D^{2.5} \times \sqrt{\frac{(P_1^2 - P_2^2)}{G \times T_f \times L \times Z \times f}} \qquad \text{Eq. 1}$$

The maximum allowable pressure drop along the compressed air pipeline was assumed 25 KPa/Km. Equation 1 was used to determine the smallest diameter of the air pipeline that satisfied the allowable pressure drop at each operating condition.

Table 2 shows performance characteristics of various components of the CAES and D-CAES systems. Performance characteristics used for the conventional CAES configuration were based on the McIntosh CAES plant. The D-CAES system had the same minimum and maximum storage pressures; however, the discharge pressure of the compressor and the work ratio were modified for each operating condition based on the anticipated pressure drop along the compressed air pipeline.

TABLE 2

| Parameter | Value | Unit |
|---|---|---|
| CAES, heat rate | 4,200 | KJ (LHV)/KWh out |
| CAES, work ratio | 0.67 | KWh in/KWh out |
| Min storage pressure | 45 | atm |
| Max storage pressure | 74 | atm |
| CAES and D-CAES, air consumption | 5 | Kg air/KWh out |
| Boiler, thermal efficiency | 80% | KJ thermal/KJ LHV |
| HRU, thermal efficiency | 70% | KWh thermal/KWh work |

Table 3 below shows economic parameters of the optimization. Table 3 shows the capital cost values used for various components of the system. All costs were converted to 2008 USD according to the Chemical Engineering Plant Cost Index and all operating and maintenance costs except the fuel charges were considered negligible.

TABLE 3

| Parameter | Base value | Unit |
|---|---|---|
| Wind farm, capital cost | 1,837 | $/KW |
| Expander, capital cost | 569 | $/KW |
| Compressor, capital cost | 522 | $/KW |
| CAES storage, capital cost | 1.5 | $/KWh |
| Boiler, capital cost | 418 | $/KW thermal |
| HRU, capital cost | 0 | $/KW thermal |
| Natural gas price | 5 | $/GJ |
| Capital charge rate | 10 | % |
| Pipeline capital cost (L = 30 km) | 984.05 × D − 31,141 | $/Km |
| Pipeline capital cost (L = 50 km) | 824.34 × D − 28,303 | $/Km |

The same heat load profile was used in all cases to simulate a large scale, concentrated municipal heat load. However, various electric load profiles were considered by linearly scaling up the "peak electric load" profile. Since an hourly heat and electric load is to be supplied over one full year, the ratio and relative shape of these two profiles play an important role in the optimum size of the system. By keeping the heat load fixed at a reasonable size, the effect of the size of the electric load was studied in various cases. Moreover, a distance of 50 Km between the compression and storage sites for the D-CAES system was considered in the base case. The simulation was repeated for a reduced distance of 30 Km to investigate the effect of distance on the optimal size of the D-CAES system. The minimum effective natural gas price above which D-CAES became economic over conventional CAES was determined by running the simulation for various electric load profiles and pipeline lengths.

The effective fuel price was considered as the summation of the market price of the fuel and the associated carbon taxes and was calculated based on Equation 2.

$$P_{eff} = P_{market} + C_{tax} \times CC_{Peff} = P_{market} + C_{tax} \times CC \quad \text{Eq. 2}$$

Table 4 below shows various scenarios that were considered in the simulation.

TABLE 4

| Case | Electric load ratio NA | Peak electric load MW electric | Peak heat load MW thermal | Pipeline length Km | D-CAES work ratio KWh, in/KWh, out |
|---|---|---|---|---|---|
| 1 | 1 | 34 | 61 | 50 | 0.70 |
| 2 | 1.5 | 51 | 61 | 50 | 0.70 |
| 3 | 2 | 68 | 61 | 50 | 0.70 |
| 4 | 2.5 | 85 | 61 | 50 | 0.70 |
| 5 | 3 | 102 | 61 | 50 | 0.70 |
| 6 | 4 | 136 | 61 | 50 | 0.70 |
| 7 | 5 | 170 | 61 | 50 | 0.70 |
| 8 | 6 | 204 | 61 | 50 | 0.70 |
| 9 | 2 | 68 | 61 | 30 | 0.69 |
| 10 | 2.5 | 85 | 61 | 30 | 0.69 |
| 11 | 3 | 102 | 61 | 30 | 0.69 |
| 12 | 4 | 136 | 61 | 30 | 0.69 |

The effective natural gas price was increased at 0.1 $/GJ intervals to find the minimum price at which the D-CAES system resulted in a lower normalized cost compared to the CAES system, in satisfying both the hourly electric and heat loads over the entire year. The electric load profile was scaled up at each case, while the heat load kept fixed (see Table 4).

Figure 4:
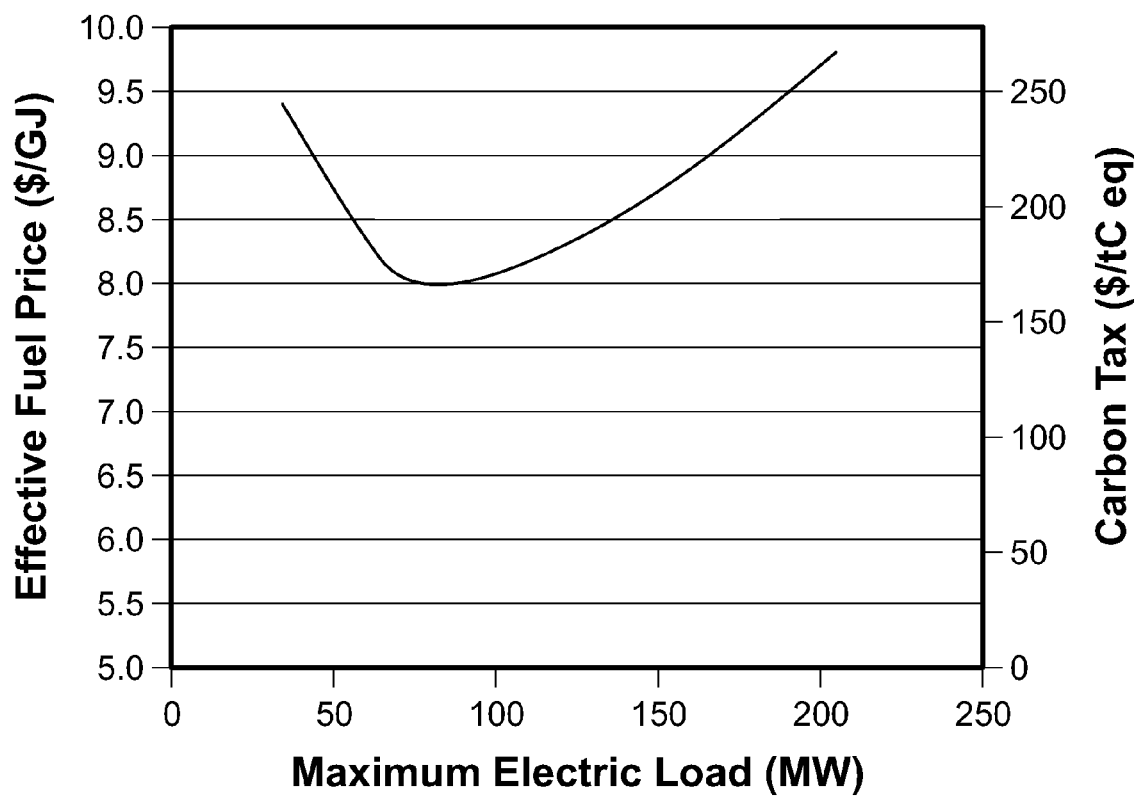
FIG. 4 is a graph showing a minimum price of fuel and a maximum electric load.

FIG. 4 is a graph showing a minimum price of fuel and a maximum electric load. The information shown in FIG. 4 is based on a pipeline length of 50 kilometers. FIG. 4 shows the minimum effective natural gas price and the equivalent carbon tax at which D-CAES with a 50 Km pipeline was more economic compared to the conventional CAES system. The equivalent carbon tax was calculated based on a fixed natural gas price of 5$/GJ and a carbon intensity of 18.0 KgC eq/GJ, including the upstream GHG emissions.

According to FIG. 4, the optimum size of the D-CAES system occurred at 2.5 times of the "peak electric load" profile (case 4) and the minimum required fuel price increased as the profile deviated from this optimum point. Table 5 and Table 6 show the capacity and performance of various components of the two systems in case 4, respectively. One should note that the D-CAES system had a slightly larger wind farm (96.0 MW) and cavern (242.3 hours of storage) compared to the conventional CAES configuration (95.0 MW and 198.5 hours of storage, respectively). On the other hand, the D-CAES system had a smaller compressor (32.9 MW) compared to the conventional system (37.5 MW). These observations lead to an interpretation that although the compressor of the D-CAES system is smaller, it has a higher capacity factor.

According to Table 6, 46.7% and 53.3% of the total electric load was satisfied by the wind farm and the expander of the storage facility, respectively in the conventional CAES configuration. These figures were 41.1% and 58.9% in the D-CAES configuration, respectively. A higher capacity factor for the compressor of the D-CAES system required a larger cavern (higher capital cost); however, at the same time it negated the fuel burning for heating purposes through recovery of the heat of compression; 52.9% of the total heat load was supplied by the HRU in the D-CAES configuration. Since the energy level of the cavern at the end of the year was forced to reach its value at the beginning of the year, a higher percentage of the electricity load (58.9%) was provided by the expander in the D-CAES system compared to the conventional CAES system (53.3%).

Table 5 below shows the capacity of various components of the CAES and D-CAES systems in case 4.

TABLE 5

| Component | Capacity | CAES | D-CAES |
|---|---|---|---|
| Wind farm | MW | 95.0 | 96.0 |
| Expander | MW | 83.7 | 83.7 |
| Compressor | MW | 37.5 | 32.9 |
| Cavern | Hours | 198.5 | 242.3 |

TABLE 5-continued

| Component | Capacity | CAES | D-CAES |
|---|---|---|---|
| HRU | MW | 0.0 | 23.0 |
| Boiler | MW | 61.1 | 52.3 |

Table 6 below shows the performance of various components of the CAES and D-CAES systems in case 4.

TABLE 6

| | | CAES | D-CAES |
|---|---|---|---|
| Wind Energy | Portion stored | 41.5% | 47.3% |
| | Portion sold | 54.2% | 47.3% |
| Electric load | Portion by wind | 46.7% | 41.1% |
| | Portion by expander | 53.3% | 58.9% |
| Heat load | Portion by boiler | 100.0% | 47.1% |
| | Portion by HRU | 0.0% | 52.9% |

Figure 5:
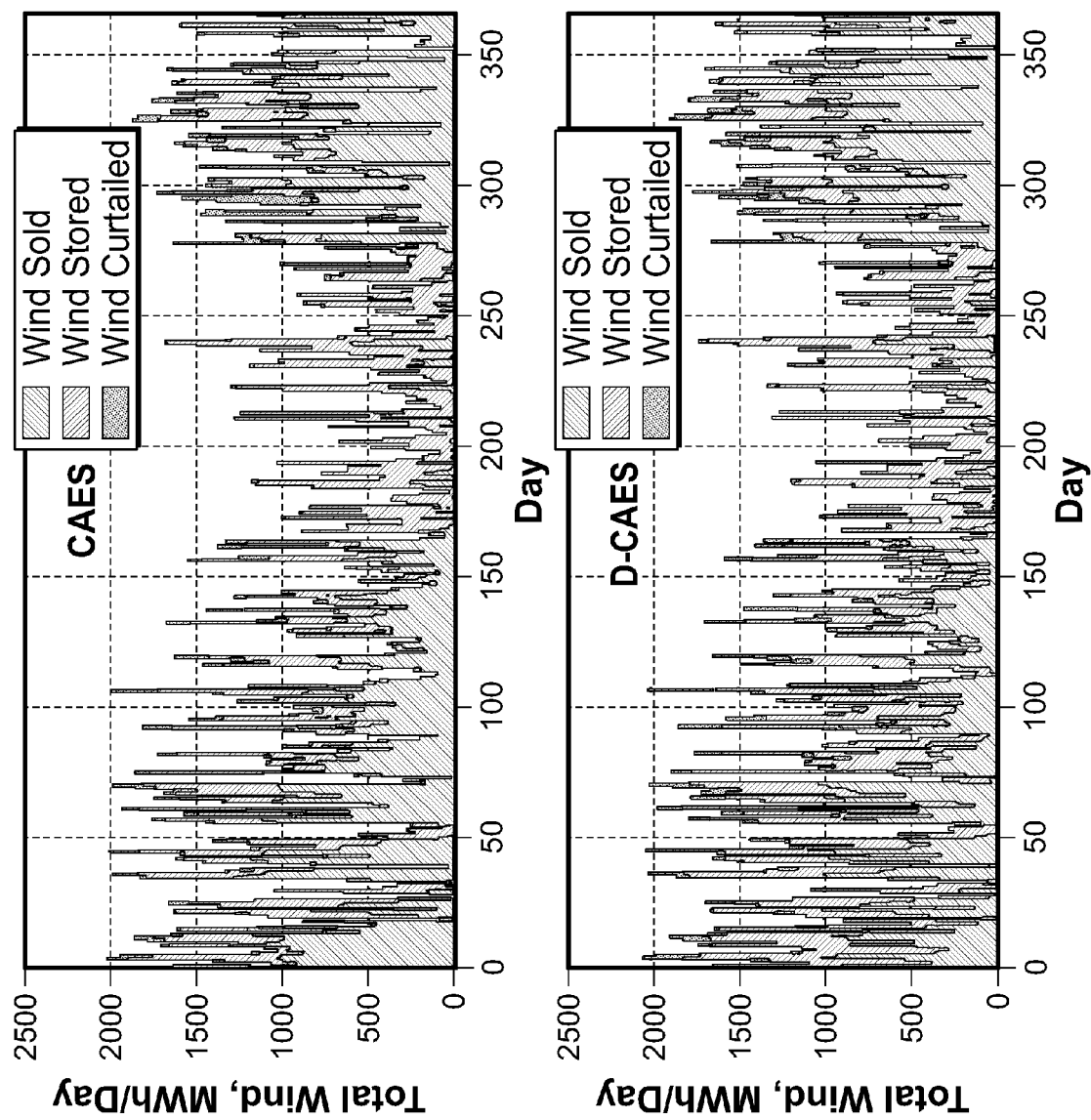
FIG. 5 is illustrates a dispatch profile of a wind farm.
Figure 6:
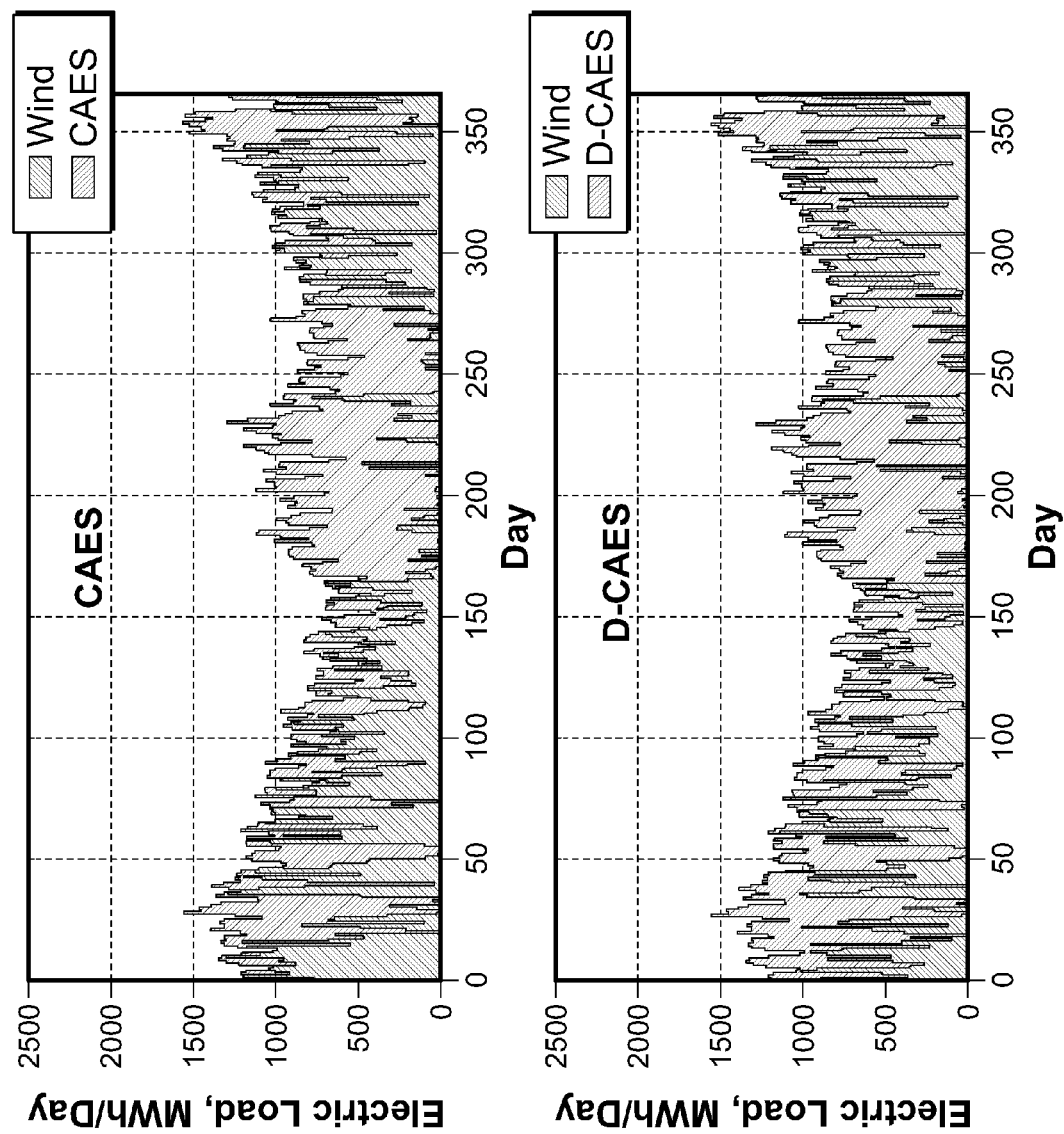
FIG. 6 shows a share of electric load supply.

FIG. 5 illustrates a dispatch profile of the wind farm. The dispatch profile is for case 4 for the CAES and D-CAES systems. As shown, not only did the D-CAES system have a larger wind farm, it tended to store more wind energy compared to the conventional CAES configuration. Since more wind energy was stored in the D-CAES configuration, the expander of this system regenerated more energy to satisfy the electric load as well (see FIG. 6). FIG. 6 shows a share of electric load supply. The electric load supply is for CAES (up) and D-CAES (down) configurations in case 4.

Figure 7:
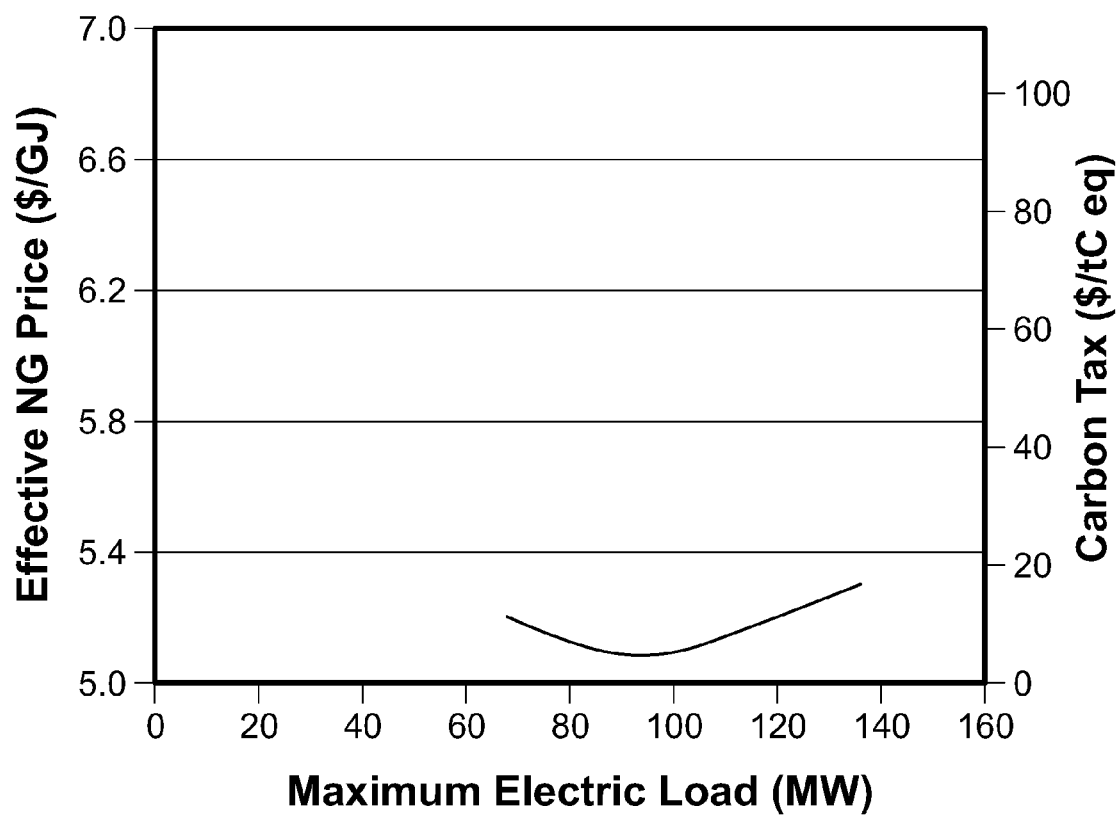
FIG. 7 shows a minimum price of fuel.

To evaluate the effect of pipeline length on the results, similar cases were developed, but with a shortened pipeline length of 30 Km (cases 9-12) instead of 50 Km (cases 1-8). The optimum size of the system occurred at about 2.5 times of the "peak electric load" profile (case 10), similar to the 50 Km scenario (case 4). However, the pipeline length had an effect on the minimum required natural gas price to make the D-CAES system more economically desirable. The minimum effective fuel price was 5.1 $/GJ at a 30 Km pipeline length, corresponding to a carbon tax of 6 $/tCeq at a base natural gas price of 5 $/GJ (FIG. 7). The minimum fuel price was 8.0 $/GJ (167 $/tCeq) at a 50 Km pipeline length (FIG. 4). Similar to case 4, the D-CAES system had a larger cavern (244.6 hours) as compared to the conventional CAES configuration (198.9 hours). In addition, the D-CAES system stored more wind energy as compared to the conventional CAES system to get benefit from the heat of compression for heating purposes (see Table 7 and Table 8). FIG. 7 shows a minimum price of fuel. The minimum price of fuel is for a lower total cost of a D-CAES system having a pipline length of 30 kilometers.

Table 7 below shows the capacity of various components of the CAES and D-CAES systems in case 10.

TABLE 7

| Component | Capacity | CAES | D-CAES |
|---|---|---|---|
| Wind farm | MW | 93.9 | 93.2 |
| Expander | MW | 83.7 | 83.7 |
| Compressor | MW | 39.9 | 35.0 |
| Cavern* | Hours | 198.9 | 244.6 |
| HRU | MW | 0.0 | 24.5 |
| Boiler | MW | 61.1 | 52.5 |

*At full generation capacity of expander.

Table 8 below shows the performance of various components of the CAES and D-CAES systems in case 10.

TABLE 8

| | | CAES | D-CAES |
|---|---|---|---|
| Wind Energy | Portion stored | 42.5% | 49.5% |
| | Portion sold | 54.0% | 46.7% |
| Electric load | Portion by wind | 46.0% | 39.4% |
| | Portion by expander | 54.0% | 60.6% |
| Heat load | Portion by boiler | 100.0% | 46.6% |
| | Portion by HRU | 0.0% | 53.4% |

Based on the various cases of the hypothetical scenario described above, the optimum size of a D-CAES system can depend on both the shape and the magnitude of an annual heat load, electric load, and the availability of off-peak electricity. A minimum effective natural gas price of approximately 8.0 $/GJ (corresponding to a carbon tax of 167 $/tCeq) can make the D-CAES system more economically favorable as compared to a conventional CAES system (at a storage distance of 50 Km). The minimum fuel price can be reduced to 5.1 $/GJ (a carbon tax of 6 $/tCeq) at a shortened storage distance between the compressed air storage facility and the municipal region of approximately 30 Km. Some factors in determining the minimum fuel price include the capital cost of the pipeline and the heating fuel savings through the recovery of the waste heat of the compressor. Furthermore, a heat storage heat unit can improve the economics of the D-CAES system, since the compression heat can be stored as low quality heat for future heating purposes.

A number of embodiments have been described. Nevertheless, it will be understood that various modifications may be made without departing from the spirit and scope of what is described here. For example, the D-CAES system is described in comparison to a conventional CAES system. However, it should be understood that the D-CAES system can be differently configured, for example, to adapt to an isothermal CAES or a CAES+Simple Cycle Gas Turbine design, wherein the compression facility of the D-CAES is located at a different location than the compressed air storage facility and the two are connected by an air pipeline. Such configurations are examples of other implementations of the D-CAES system. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed:

1. A distributed compressed air storage system comprising:
a compression facility that is configured to compress air with an air compressor electrically powered from a renewable-energy based source of electricity;
a pipeline that is coupled to the compression facility and is configured to transport compressed air from the compression facility to a compressed air storage facility that is remote from the compression facility;
a heat recovery unit that is coupled to the compression facility and is configured to recover heat produced by compressing air in the compression facility;
the compressed air storage facility that is configured to store compressed air received from the pipeline and is located remote from the compression facility; and
an expansion facility that is configured to receive compressed air from the compressed air storage facility and expand the compressed air to generate electricity.

2. The system of claim 1, wherein the expansion facility is located at a same location as the compression facility.

3. The system of claim 1, wherein the expansion facility is located at a same location as the compressed air storage facility.

4. The system of claim 1, wherein the expansion facility is located at a different location than the compression facility and a different location than the compressed air storage facility.

5. The system of claim 1, wherein the compression facility is located in an urban location or in a densely populated location and the compressed air storage facility is located in a rural location or in a sparsely populated location.

6. The system of claim 1, wherein:
the compression facility is located at a same location as a heat load;
the heat recovered by the heat recovery unit is supplied to satisfy, at least in part, the heat load; and
the compressed air storage facility is located at a different location than the heat load.

7. The system of claim 1, further comprising:
a thermal energy storage unit coupled to the heat recovery unit and configured to store at least some of the heat recovered by the heat recovery unit.

8. The system of claim 1, wherein the heat recovered by the heat recovery unit is provided to satisfy a heat load for a region that is proximate to the compression facility, and wherein the region is remote from the compressed air storage facility and the expansion facility.

9. The system of claim 1, wherein a first portion of electrical power generated by the renewable-energy based source of electricity is provided to power the air compressor, and a second portion of the electrical power generated by the renewable-energy based source of electrical power is combined with the generated electricity generated by the expansion facility.

10. The system of claim 1, wherein the renewable-energy based source of electricity comprises at least one of a wind energy source or a solar energy source.

11. The system of claim 1, wherein the compression facility is located approximately fifty kilometers away from the compressed air storage facility.

12. The system of claim 1, wherein the compressed air storage facility comprises an underground storage facility or a cavern.

13. The system of claim 1, wherein the compressed air storage facility comprises an above ground storage facility.

14. The system of claim 1, wherein the expansion facility is further configured to heat the received compressed air.

15. The system of claim 1, wherein the compression facility is coupled to a heating system that is configured to provide heat to one or more facilities and wherein heat recovered by the heat recovery unit is used to provide heat to the one or more facilities.

16. The system of claim 15, wherein the expansion facility is further configured to provide the generated electricity to the one or more facilities.

17. The system of claim 15, wherein the heating system comprises a district heating system.

18. The system of claim 17, wherein the district heating system includes a boiler system configured to generate hot water and wherein the heat recovered by the heat recovery unit is used to generate hot water.

19. The system of claim 1, further comprising:
a renewable-energy based source of electricity configured to provide electricity to the compression facility and to a region that is proximate to the compression facility to satisfy at least one of a heat load or an electric load of the region, and the renewable-energy based source of electricity comprises at least one of a wind energy source or a solar energy source.

20. The system of claim 19, wherein electricity generated by the expansion facility is provided to the region to satisfy at least one of the heat load or the electric load of the region.

21. The system of claim 1, wherein the expansion facility includes one or more turbines.

22. The system of claim 21, wherein the expansion facility further includes one or more generators coupled to one or more turbines, wherein the one or more generators are configured to generate electricity.

23. The system of claim 21, wherein the expansion facility further includes a heat source and is configured to heat the received compressed air.

24. The system of claim 23, wherein the heat source comprises one or more of a combustor, heat recovered from a proximate facility that generates waste heat or a recuperator for heat recovery from exhaust of one or more turbines.

25. The system of claim 1, further comprising a control system configured to determine when to retrieve compressed air from the compressed air storage facility and generate electricity.

26. The system of claim 25, wherein the control system is further configured to receive data from one or more sources and wherein the determination is based at least in part on the received data.

27. The system of claim 26, wherein the one or more sources include one or more sensors.

28. The system of claim 26, wherein the one or more sources include a source that provides data about prices of electricity.

29. The system of claim 26, wherein the one or more sources include a source that provides data about demand for electricity.

30. A method comprising:
providing electricity to the compression facility from a renewable-energy based source of electricity;
compressing air at a compression facility with an air compressor electrically powered by the electricity provided from the renewable-energy based source of electricity;
transporting the compressed air through a pipeline to a compressed air storage facility that is located remote from the compression facility;
recovering heat that is generated from compressing the air and providing the recovered heat to satisfy at least one of a heat load or an electric load for one or more facilities that are located proximate to the compression facility;
storing the compressed air in the compressed air storage facility; and
retrieving the compressed air from the compressed air storage facility and expanding the compressed air at an expansion facility to generate electricity.

31. The method of claim 30, further comprising:
providing the electricity generated by the expansion facility to satisfy at least one of the heat load or the electric load for the one or more facilities.

32. The method of claim 30, wherein the compression facility is coupled to a district heating system that is configured to provide heat to satisfy the heat load of the one or more facilities.

33. The method of claim 30, further comprising:
determining when to retrieve compressed air from the compressed air storage facility to generate electricity based at least in part on at least one of a price of electricity at a time of retrieval or a demand for electricity at a time of retrieval.

34. The method of claim 30, wherein storing the compressed air in the compressed air storage facility comprises storing the compressed air in an underground cavern.

35. The method of claim 30,
wherein the renewable-energy based source of electricity comprises at least one of a wind energy based source or a solar energy based source.

36. The method of claim 30, wherein the expansion facility is located at a same location as at least one of the compression facility or the compressed air storage facility.

37. The method of claim 30, wherein the expansion facility is located at a different location than the compression facility and a different location than the compressed air storage facility.

38. The method of claim 30, wherein the compression facility is located in an urban location or in a densely populated location and the compressed air storage facility is located in a rural location or in a sparsely populated location.

39. The method of claim 30, further comprising:
storing at least some of the recovered heat in a thermal energy storage unit.

40. The method of claim 30, further comprising:
providing a first portion of electrical power generated by the renewable-energy based source of electricity to power the air compressor; and
combining a second portion of the electrical power generated by the renewable-energy based source of electrical power with the generated electricity generated by the expansion facility.

* * * * *